No. 802,158. PATENTED OCT. 17, 1905.
H. F. DUNN.
CHEESE CUTTER.
APPLICATION FILED OCT. 1, 1904.
3 SHEETS—SHEET 1.
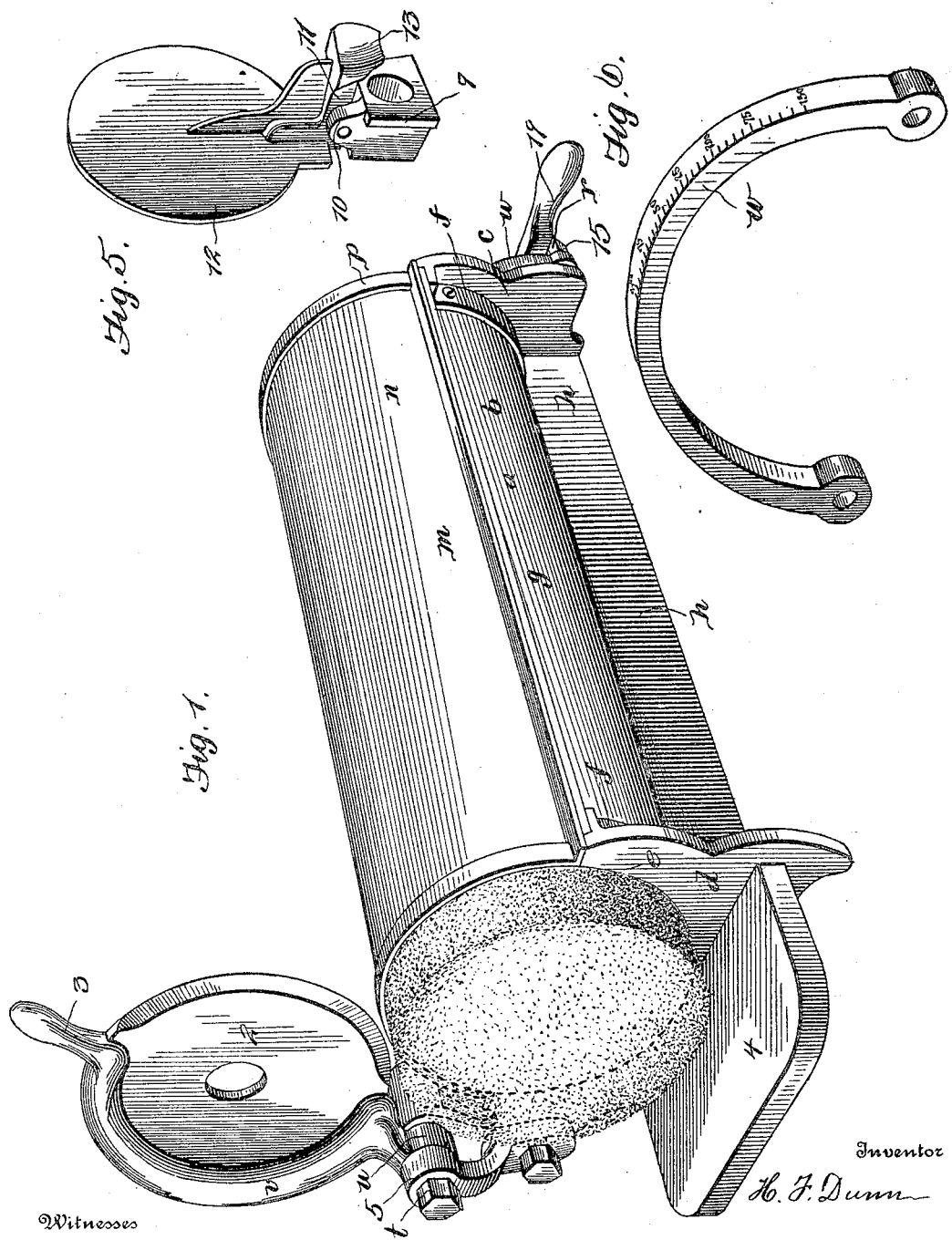
Witnesses
R. A. Boswell
A. G. Gedney
Inventor
H. F. Dunn
By E. W. Anderson
his Attorney

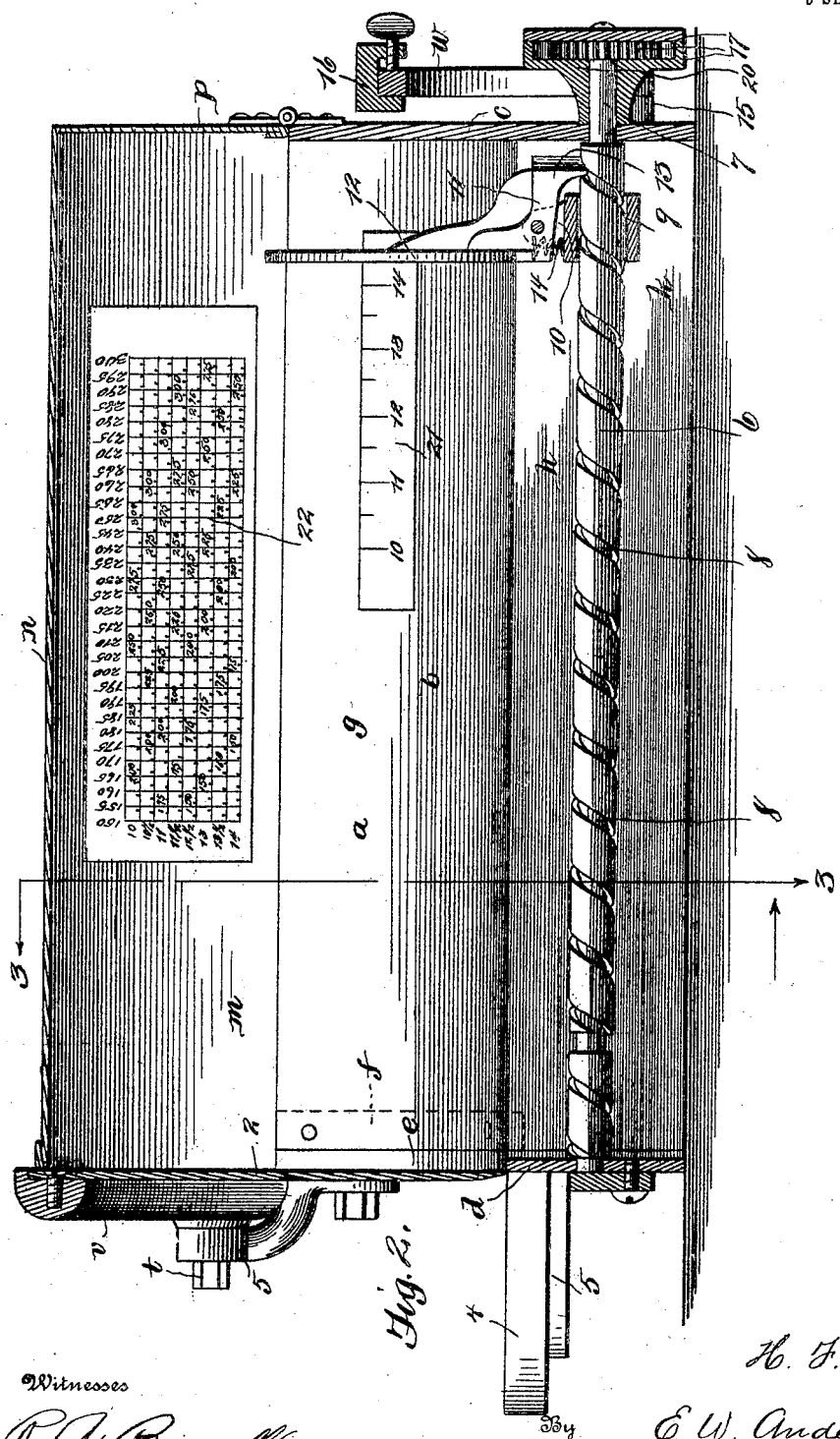

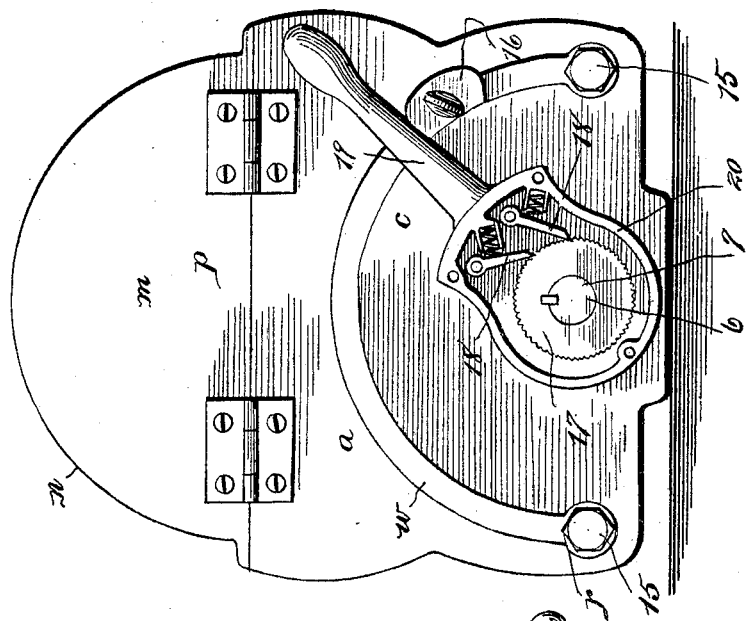
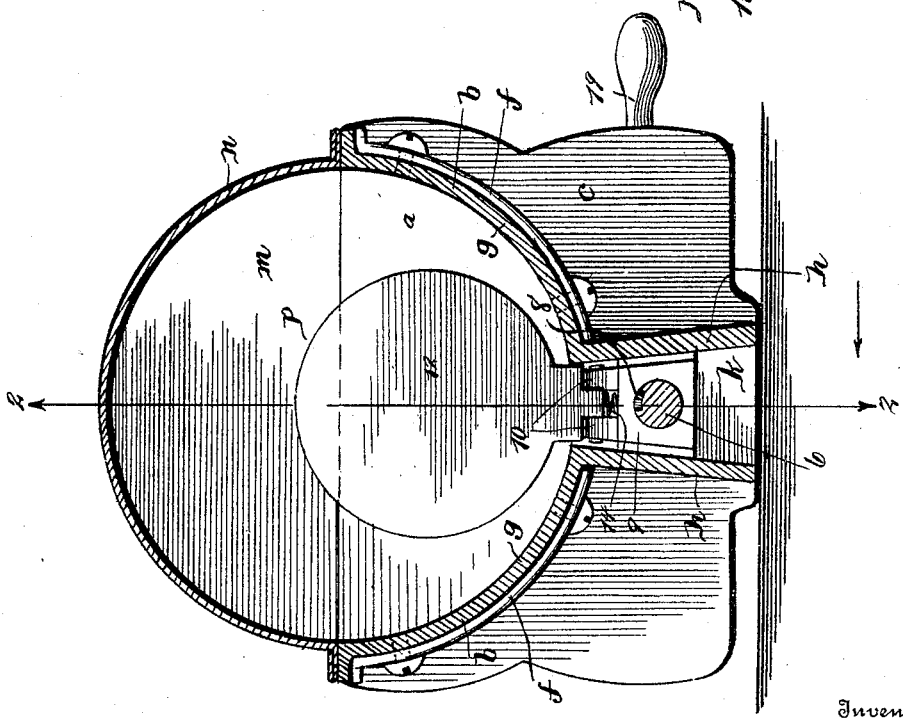

UNITED STATES PATENT OFFICE.

HENRY F. DUNN, OF ELWOOD, INDIANA, ASSIGNOR TO DUNN MANUFACTURING COMPANY, OF ANDERSON, INDIANA, A CORPORATION OF INDIANA.

CHEESE-CUTTER.

No. 802,158.   Specification of Letters Patent.   Patented Oct. 17, 1905.

Application filed October 1, 1904. Serial No. 226,785.

*To all whom it may concern:*

Be it known that I, HENRY F. DUNN, a citizen of the United States, and a resident of Elwood, in the county of Madison and State of Indiana, have made a certain new and useful Invention in Cheese-Cutters; and I declare the following to be a full, clear, and exact description of the same, such as will enable others skilled in the art to which it appertains to make and use the invention, reference being had to the accompanying drawings, and to letters and figures of reference marked thereon, which form a part of this specification.

Figure 1 is a perspective view of the invention. Fig. 2 is a central longitudinal sectional view. Fig. 3 is a transverse sectional view on line 3 3 of Fig. 2. Fig. 4 is a rear view. Fig. 5 is a detail view of the follower. Fig. 6 is a detail view of the arc-bar.

The invention relates to computing cheese-cutters for use mainly in connection with long cheeses; and it consists in the construction and novel combinations of parts, as hereinafter set forth. A cheese of this long character is approximately cylindrical, but, in fact, is a frustum of a slightly-tapering cone, the larger end being about one-half inch greater in diameter than the smaller end. Usually a cheese of this kind is twelve inches long and it weighs twelve pounds. The average diameter is six inches.

In the accompanying drawings, illustrating the invention, the letter $a$ designates the lower portion of the case, consisting of the side walls $b$, the rear head $c$, and the front head $d$, which is recessed in semicircular form to provide the lower half of the mouth or opening of the casing, the concavity of the margin $e$ of the recess corresponding to the curvature of the side walls. Flanges $f$ are provided on the heads for the attachment of the side walls, which are secured thereto by screws. The side walls consist each of an elongated curved wall $g$, having extending downward from the lower portion thereof an elongated vertical flange $h$. These vertical flanges are separated from each other to provide an interval or channel $k$, which extends along the middle of the bottom of the casing. The upper portion or cover portion $m$ of the casing consists of a semicylindrical arched top $n$, to which is attached a semicircular end $p$, the lower edge of which is hinged to the upper edge of the head $c$ of the lower portion of the casing.

The front head $d$ is provided with an arm having strong seats 5 for the pivot-bolt $t$, on which the pivot bearing or eye $u$ of the knife-frame $v$ turns. The knife-frame is semicircular and is rabbeted on the inside of its arched portion to receive the circular vertical blade 2, which is secured in its seat by means of screws. The handle 3 of the knife-frame extends laterally from the free end thereof. The lower marginal portion of the circular knife is sharpened on an outer bevel, so that the inside face of the blade is plane to the cutting edge. The outer edge of the concave margin $e$ of the front head is designed to be so nearly in the plane of the rear face of blade as to engage it neatly when the knife is brought down to make a cut through the cheese. A wooden abutment or platform 4, slightly below the level of the lowest portion of said margin, is secured to a flange 5 of this head. This platform serves to receive the slice of cheese as it is cut off and provides a stop or buffer for limiting the downward movement of the knife-blade without injury to its cutting edge.

In the channel $k$ is located longitudinally a worm or spirally-grooved shaft 6, which is pivoted to the front head and has an extension 7 through a bearing in the rear head. The spiral groove 8 increases slightly in pitch toward the rear end of the shaft. Embracing the shaft is a carriage or slide-piece 9, having ears 10, to which is pivoted a follower 11, which projects vertically upward between the concave side walls of the lower half of the casing. The follower has a bearing-plate 12, which is usually of circular form and extends transversely in proper position to engage the rear end of the cheese. The follower has an arm 13, which is provided with an oblique tooth engaging the spiral groove 8 of the shaft. The follower has a slight rocking play on its pivots and is held normally in engagement with the spiral groove by a spring 14. The play of the follower is limited by the engagement of the toothed arm 13 with the groove of the shaft. When the follower is to be moved back to the rear of the casing, it is rocked or tipped forward to disengage the toothed arm from the groove, when the follower and its carriage can be readily pushed backward along the shaft.

The rear head is provided with attached bolts, one at each side, as indicated at 15, for securing the ends of the vertical transverse arched scale-bar w, on which is located an adjustable stop 16.

The extension 7 of the spirally-grooved shaft is provided with a finely-toothed pinion 17, which is engaged by spring-pawls 18 of the operating-lever 19, which is pivoted on said extension. The lever 19 is provided with a boxing 20, inclosing the pinion and pawls. Looking toward the front of the casing the pawls are located at the left of the boxing to engage the pinion 17 as the lever is moved from the starting-rest r to the right, turning the spirally-grooved shaft and moving the follower forward such a distance as the limiting-stop 16 provides for according to its adjustment on the scale-bar W. The pitch of the spiral groove is usually one inch at the rear end, gradually increasing to one and one-eighth inch at the front end, the cheese being placed in the casing with the larger end to the front or nearest the knife.

The arc-bar scale is shown as graduated for total values of cheeses from "$1.50" to "$3.00" and for a standard length of cheese, this being twelve inches. In a cheese of a total value of one dollar and fifty cents there will be thirty pieces worth five cents each, and it is designed to operate so that thirty moves of the lever 19 will advance the follower-plate just twelve inches. It will also be the case for a cheese of any other total value that the proper number of moves of the handle or lever 19 will advance the cheese just twelve inches. If, however, the cheese should be shorter—say ten inches long—it is obviously necessary to shorten the movement of the handle-lever for the five cents worth of cheese of the same value—that is to say, if the cheese is ten inches long and has a total value of two dollars the stroke of the lever 19 should be shortened so that forty movements thereof will advance the follower just ten inches. The proper place to set the limiting-stop on the arc-bar would therefore be at a point which is twelve-tenths of two dollars—that is to say, at "$2.40"—or the vertical arched bar can be made broad enough to carry total-value scales for cheeses of various lengths. In this case it is only necessary to set the limiting-stop 16 at the graduation-mark for the total value of the cheese on the proper scale for the length of cheese in the casing.

The wall of the lower portion of the casing is usually provided with a measuring line of figures at 21 to indicate the approximate length of the cheese being operated on.

A comparative total-value scale may also be provided, as at 22, to show the proper points on a twelve-inch scale-bar to place the limiting-stop to measure off five cents worth of cheeses of greater or less length than twelve inches. The usual length of cheese is, as above stated, twelve inches; but it may vary from ten inches to fourteen inches. The scale 22 shows lines of graduations referring to certain lengths of cheeses and carrying figures relating to the twelve-inch scale-bar, of which the total values are shown in the upper line. In finding the point on the arc-bar to place the limit-stop for a cheese, say, fourteen inches long, of which the total value is two dollars and eighty-five cents, the vertical scale-line from the value "$2.85" in the top line crosses the line of figures for the length fourteen inches at "$2.45," which indicates the proper place for the limiting-stop.

Having described the invention, what I claim, and desire to secure by Letters Patent, is—

1. A cheese-cutter having a horizontal spirally-grooved shaft, a follower operated by said shaft, a knife adjacent to the front end of said shaft, a scale-bar adjacent to the rear end of said shaft, its adjustable stop, and a feed-lever adjacent to said scale-bar for operating said shaft, substantially as specified.

2. A longitudinal screw-feed cheese-cutter having a feed-screw shaft, a follower operated thereby, a knife adjacent to the front end of said screw, an intermittent-grip feed-lever engaging the rear end of said screw, a scale-bar, and its stops for limiting the movement of said feed-lever, substantially as specified.

3. In a cheese-cutter, the combination with a support for the cheese, a spirally-channeled feed-shaft, and an adjustable follower on said shaft, of a vertical arched scale-bar, its adjustable stop, an operating-lever, and an intermittent-grip device between said operating-lever and shaft, substantially as specified.

4. In a longitudinal-feed cheese-cutter, the combination with a channeled casing and a movable knife at its end, of a spiral feed-shaft, an adjustable follower thereon, a transverse scale-bar, its adjustable stop, a pinion on the feed-shaft, and a lever adjacent to said scale-bar and having an intermittent engagement with said pinion, substantially as specified.

5. A cheese-cutter having in combination with a channeled support, and a movable knife, a spirally-grooved shaft, a follower engaging said shaft, a lever-handle, an intermittent-grip device between the same and the shaft, and means for varying the stroke of the lever, substantially as specified.

6. In a cheese-cutter, the combination with a channeled casing, and a knife connected to its end, of a screw-feed shaft of increasing pitch, a follower on said shaft, and a lever-handle having an intermittent grip engagement with said feed-shaft, substantially as specified.

In testimony whereof I affix my signature in presence of two witnesses.

HENRY F. DUNN.

Witnesses:
  A. F. CONNER,
  CHARLES MCDERMOTT.